March 5, 1935.　　　F. J. PFEIFLE　　　1,993,018
ARTIFICIAL LURE
Filed Feb. 28, 1933
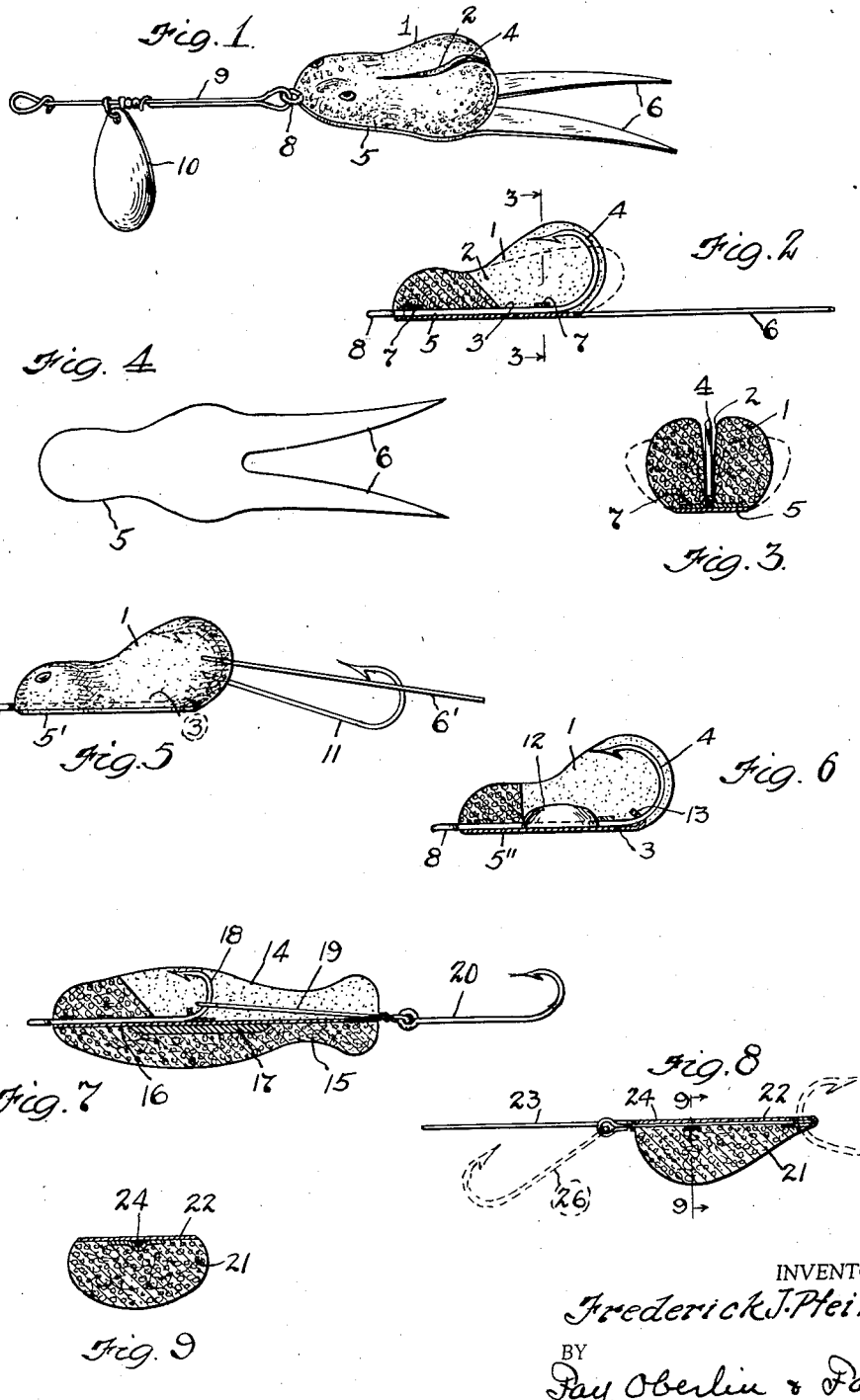
INVENTOR.
Frederick J. Pfeifle
BY
Fay, Oberlin & Fay
ATTORNEYS.

Patented Mar. 5, 1935

1,993,018

UNITED STATES PATENT OFFICE 1,993,018

ARTIFICIAL LURE

Frederick J. Pfeifle, Willoughby, Ohio, assignor of one-half to John L. Smith

Application February 28, 1933, Serial No. 658,985

2 Claims. (Cl. 43—42)

This invention relates, as indicated, to artificial lures, but has reference more particularly to lures of novel construction embodying materials having certain desired physical characteristics.

A primary object of the invention is to provide a lure of the character described, in which the body or essential body portions of the lure are made of sponge or crepe rubber having a natural rough porous water-pervious surface, whereby the lure may in some cases be used either as a floating lure or as an under-water lure.

Another object of the invention is to provide a lure having a body made of a material which is highly yielding or resilient in character and which has the appearance of live or natural bait.

To the accomplishment of the foregoing and related ends, said invention, then, consists of the constructional and other features hereinafter fully described and particularly pointed out in the claims.

The annexed drawing and the following description set forth in detail certain constructional forms embodying the invention, such disclosed forms constituting, however, but a few of the various mechanical forms in which the principle of the invention may be used:

In said annexed drawing:

Fig. 1 is a perspective view of an artificial lure embodying most of the features of the invention; Fig. 2 is a longitudinal cross-sectional view of the lure illustrated in Fig. 1; Fig. 3 is a transverse cross-sectional view of the lure illustrated in Fig. 1, taken on a plane substantially indicated by the line 3—3 of said figure; Fig. 4 is a plan view of the sheet rubber base of the lure illustrated in Figs. 1 to 3; Fig. 5 is a side elevational view of a lure similar to that shown in Figs. 1 to 3 but with the tail-like appendages arranged somewhat differently; Fig. 6 is a longitudinal cross sectional view of a lure similar to that shown in Figs. 1 to 3, but with the addition of a ballasting weight; Fig. 7 is a longitudinal cross-sectional view of a modied form of lure; Fig. 8 is a longitudinal cross-sectional view of a lure made in simulation of a pork-chunk; and Fig. 9 is a transverse cross-sectional view of the lure illustrated in Fig. 8, taken on a plane substantially indicated by the line 9—9 in said figure.

Referring more particularly to that form of the invention illustrated in Figs. 1 to 4, it will be seen that the lure comprises a body 1, which is made in simulation of any desired live bait, such as a mouse, minnow, frog, etc. The body of the lure is preferably made of sponge or crepe rubber, and may be cut from a large piece of such rubber with the aid of dies or by casting in molds and roughening or abrading the surface of the molded body in any desired manner to expose the natural rough porous character of the sponge rubber. In this manner, a lure body is provided having a porous, water-previous surface, which is distinctly different from the smooth, nonporous water-impervious skin characteristic of molded sponge rubber articles. A lure body formed in the aforesaid manner possesses certain distinct characteristics and advantages. In the first place, the porous body is pervious to water, so that when it is squeezed and immersed in water, it will absorb the water in a manner similar to that in which a sponge absorbs water when squeezed. This water absorbing property enables the lure, when heavy with absorbed water, to be used as an under-water lure. In its normal condition, or after the water is squeezed out of the body 1, the lure is adapted to float as a surface lure. While it has heretofore been proposed to use sponge rubber for artificial lures, such lures, so far as I am aware, have the smooth surface skin resulting from the molding operation, which skin is not visibly porous or pervious to the absorption of water.

Another advantage resulting from the use of a sponge rubber lure body having a porous surface is that the lure body is thereby rendered more resilient and less-resistant to the attack of a fish attracted by the lure. This properly, the advantages of which will be presently pointed out, is possessed to a considerably lesser degree by a sponge rubber body having a smooth surface skin.

A still further advantage of a sponge rubber lure body having a porous surface is that it presents a more natural or live appearance than a lure body having a smooth skin, with the result that fish are more likely to be attracted to and attack the lure.

The body 1 of the lure is preferably longitudinally slitted adjacent its rear portion, as at 2, and is provided with a hook 3, the upwardly curved portion 4 of which is disposed within the slit 2, and is thus substantially concealed from view by the body of the lure. For the purpose of securing the hook 3 to the body of the lure, and to somewhat reinforce said body, I provide a base 5 of sheet rubber or the like, which may be vulcanized, cemented, or otherwise secured to the body 1. The base 5 is preferably provided with tail-like appendages 6, which serve to stabilize the lure in the water and constitute essential lure elements. Sheet rubber straps 7 cemented to the base 5 assist in properly securing the hook 3 within the body of the lure. Secured to an eye 8 at the forward end of hook 3 is a shaft 9, on which is mounted a spinner 10.

It will be noted that the body 1 of the lure so conceals the hook 3 as to prevent the hook from becoming snagged by weeds, logs, or other obstructions when the lure is drawn through the water. As previously pointed out, the body of the lure is so resilient that when a fish bites the same, it will be readily compressed, as indicated by the dotted lines in Figs. 2 and 3, with the result that the hook portion 4 becomes exposed and subject to seizure by the fish. Moreover, the absence of the smooth surface skin from the body of the lure renders such body so yielding in its nature that when a fish bites the same, its teeth will become readily embedded in the sponge rubber, and the adherence of the sponge rubber to the teeth of the fish is such as to render it extremely difficult for the fish to "spit out" the lure. It has been found, in practice, that the smooth surface skin of a sponge rubber lure renders such lure so resistant and unyielding as to prove unattractive to certain types of fish, which bite readily when the body of the lure is rendered soft and yielding by the removal of such surface skin.

In that form of the lure shown in Fig. 5, the base 5' is not provided with tail-like appendages, as in Fig. 1, but separate sheet-rubber appendages 6' are employed, the body 1 of the lure being appropriately slitted to receive the inner ends of such appendages, which are then cemented or otherwise secured to the body at these points. It is preferred, however, to make the appendages integral with the base 5, as in Fig. 1, as in such case they are less likely to be pulled off the lure. In addition to the slightly different arrangement of the appendages as shown, a trailer hook 11 is provided, which is secured to the hook 3.

In cases where the lure is to be used primarily as an under-water lure, the hook 3 thereof may be initially provided with ballast in the form of a weight 12, of lead or other metal, as shown in Fig. 6. In this modification, the sheet-rubber base 5" is provided with an upwardly turned loop portion 13, which assists in properly positioning the hook 3.

In that modification of the invention illustrated in Fig. 7, the lure is made in simulation of a small fish and consists of complementary body portions 14 and 15 which are vulcanized, cemented or otherwise secured to an intermediate sheet-rubber reinforcing member 16, a metallic weight 17 being interposed between the body portion 15 and member 16. The body portion 14 is slit similarly to the body of the lure shown in Fig. 1, so as to receive a portion of hook 18. Secured to the hook 18 is a leader 19 to whic hin turn, is secured a trailer hook 20.

In that modification of the invention illustrated in Figs. 8 and 9, the body of the lure is made in simulation of a chunk of pork, commonly referred to as a "pork-chunk" lure. The body 21 of the lure has cemented thereto a sheet-rubber reinforcing member 22, provided with appendages 23, as in that form of the invention shown in Fig. 1. Interposed between the body 21 and member 22 is a wire leader 24, to which may be secured a hook, as indicated at 25, and a trailer hook as indicated at 26.

It will be understood that in the various forms of the invention which have been described, the body or essential body portions are formed of sponge or crepe rubber having a natural rough porous water-pervious surface, and that such bodies or essential body portions may be made in the manner herein described or in any other desired manner.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. An artificial lure comprising a body formed of sponge rubber having a rough porous surface, a member formed of sheet rubber secured to said body, and hook means having portions interposed between said body and said member.

2. An artificial lure comprising a body formed of sponge rubber, said body having a porous, water pervious surface, a member formed of sheet rubber secured to said body and hook means having a portion thereof secured to said body and said member.

FREDERICK J. PFEIFLE.